(12) United States Patent
Yeh et al.

(10) Patent No.: US 12,143,724 B2
(45) Date of Patent: Nov. 12, 2024

(54) CLAMPING DEVICE, ELECTRONIC DEVICE AND REMOTE CONTROL METHOD OF ELECTRONIC DEVICE

(71) Applicant: ASUSTeK COMPUTER INC., Taipei (TW)

(72) Inventors: Yea-Chin Yeh, Taipei (TW); Chi-Hwa Ho, Taipei (TW); Yi-Teng Tsai, Taipei (TW); Chun-Wei Lu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 35 days.

(21) Appl. No.: 17/970,512

(22) Filed: Oct. 20, 2022

(65) Prior Publication Data
US 2023/0362488 A1 Nov. 9, 2023

(30) Foreign Application Priority Data
May 4, 2022 (TW) .................................. 111116764

(51) Int. Cl.
*G06F 1/16* (2006.01)
*F16M 11/04* (2006.01)
(Continued)

(52) U.S. Cl.
CPC ......... *H04N 23/685* (2023.01); *F16M 11/041* (2013.01); *F16M 11/121* (2013.01);
(Continued)

(58) Field of Classification Search
CPC .... G06F 1/1626; G06F 1/1628; G06F 1/1656; G06F 1/166; G06F 1/1677; G06F 1/1679;
(Continued)

(56) References Cited

U.S. PATENT DOCUMENTS

2003/0179306 A1* 9/2003 Lee ...................... H04N 23/531
348/E5.043
2004/0196265 A1* 10/2004 Nohr ................ H04M 1/724095
345/169
(Continued)

FOREIGN PATENT DOCUMENTS

CN 106534698 3/2017
CN 107635053 1/2018
(Continued)

*Primary Examiner* — Anthony Q Edwards
(74) *Attorney, Agent, or Firm* — JCIPRNET

(57) ABSTRACT

A clamping device, an electronic device, and a remote control method of the electronic device. The clamping device includes a clamping unit, a first communication unit, and a control unit. The clamping unit is suitable for clamping the electronic device. The first communication unit is suitable for pairing with a second communication unit of the electronic device. The control unit is coupled to the clamping unit and the first communication unit. When the clamping unit is switched from an off mode to an on mode, the control unit controls the first communication unit to pair with the second communication unit and sends a screen-off command to the second communication unit via the first communication unit after the pairing is completed. When the clamping unit is in a clamping mode, the control unit sends an application open command to the second communication unit via the first communication unit.

14 Claims, 6 Drawing Sheets

(51) Int. Cl.
*F16M 11/12* (2006.01)
*F16M 13/04* (2006.01)
*H04N 23/66* (2023.01)
*H04N 23/667* (2023.01)
*H04N 23/68* (2023.01)

(52) U.S. Cl.
CPC ............ *F16M 13/04* (2013.01); *H04N 23/66* (2023.01); *H04N 23/667* (2023.01); *F16M 2200/04* (2013.01)

(58) Field of Classification Search
CPC .... G06F 1/1684; H04N 23/66; H04N 23/667; H04N 23/685

See application file for complete search history.

(56) References Cited

U.S. PATENT DOCUMENTS

| | | | |
|---|---|---|---|
| 2014/0171137 A1* | 6/2014 | Oh | H04W 52/0229 |
| | | | 455/509 |
| 2016/0020805 A1* | 1/2016 | Fan | B60R 11/04 |
| | | | 455/556.1 |
| 2016/0342780 A1 | 11/2016 | Lee et al. | |
| 2017/0176987 A1* | 6/2017 | Deng | F16M 11/041 |
| 2019/0123776 A1* | 4/2019 | Nieminen | H04M 1/0249 |
| 2019/0258143 A1* | 8/2019 | Zhou | G03B 5/00 |
| 2019/0346882 A1* | 11/2019 | Dillow | G06F 1/1632 |
| 2021/0165306 A1* | 6/2021 | Guo | G03B 17/561 |
| 2022/0377229 A1* | 11/2022 | Voss | G03B 17/56 |
| 2023/0244224 A1* | 8/2023 | Zhou | G05D 1/0016 |
| | | | 701/2 |
| 2023/0385006 A1* | 11/2023 | Richter | G06F 3/14 |

FOREIGN PATENT DOCUMENTS

| | | |
|---|---|---|
| CN | 206977492 | 2/2018 |
| TW | 201642665 | 12/2016 |

\* cited by examiner

CLAMPING DEVICE, ELECTRONIC DEVICE AND REMOTE CONTROL METHOD OF ELECTRONIC DEVICE

CROSS-REFERENCE TO RELATED APPLICATION

This application claims the priority benefit of Taiwan application serial no. 111116764, filed on May 4, 2022. The entirety of the above-mentioned patent application is hereby incorporated by reference herein and made a part of this specification.

BACKGROUND

Technical Field

The disclosure relates to a clamping device and an electronic device that may be paired with each other, and a remote control method of an electronic device.

Description of Related Art

At present, most of the clamping units of the handheld stabilizers on the market are clamping claws with springs, which require the user to manually open the clamping claws to clamp the smartphone in the clamping claws, then manually turn on the power of the stabilizer through the power switch on the handle, manually turn on/unlock the mobile phone screen, and manually control the stabilizer to pair with the mobile phone for wireless transmission. If there is a dedicated application program corresponding to the stabilizer on the phone, it is also required to manually click to open the application program. Since there is no specific communication protocol between the mobile phone and the stabilizer, the mobile phone screen cannot be automatically turned on or off through the wireless transmission protocol, it is also impossible to provide an intelligent and efficient experience of automatically unlocking the screen and automatically opening dedicated application programs through the underlying services of the system.

SUMMARY

According to the first aspect of this disclosure, a clamping device is provided. The clamping device includes a clamping unit, a first communication unit, and a control unit. The clamping unit is suitable for clamping an electronic device. A first sensing unit is used for sensing a clamping state of the clamping unit. The first communication unit is suitable for pairing with a second communication unit of the electronic device. The control unit is coupled to the clamping unit and the first communication unit. When the clamping unit is switched from an off mode to an on mode, the control unit controls the first communication unit to pair with the second communication and sends a screen-off command to the second communication unit via the first communication unit after the pairing is completed. When the clamping unit is in a clamping mode, the control unit sends an application open command to the second communication unit via the first communication unit.

According to the second aspect of this disclosure, an electronic device is provided. An application program corresponding to a clamping device is stored in the electronic device. The electronic device includes a display unit, a second communication unit, and a control unit. The second communication unit is suitable for pairing with a first communication unit of the clamping device. The control unit is coupled to the display unit and the second communication unit. When the second communication unit receives a pairing request sent via the first communication unit, the control unit controls the second communication unit to pair with the first communication unit, and when the second communication unit receives a control command sent via the first communication unit, the control unit turns off the display unit or opens the application program according to the control command.

The disclosure also provides a remote control method of an electronic device, which includes the following operation. When a clamping unit of a clamping device is switched from an off mode to an on mode, a first communication unit of the clamping device is controlled to pair with a second communication unit of the electronic device, and a screen-off command is sent to the second communication unit via the first communication unit after the pairing is completed. When the clamping unit is in a clamping mode, the first communication unit sends an application open command to the second communication unit to turn on or unlock the display unit and open an application program corresponding to the clamping device stored in the electronic device.

Based on the above, in the clamping device, the electronic device, and the remote control method of the electronic device in this disclosure, when the clamping unit of the clamping device is switched from the off mode to the on mode, the control unit of the clamping device may control the first communication unit of the clamping device to pair with the second communication unit of the electronic device, and send a screen-off command via the first communication unit to turn off the display unit of the electronic device. When the clamping unit is in the clamping mode, the control unit of the clamping device may send an application open command via the first communication unit to turn on or unlock the display unit of the electronic device, and open an application program corresponding to the clamping device stored in the electronic device. In this way, the clamping device may automatically communicate with the electronic device according to the state of the clamping unit, automatically turn the display unit of the electronic device on and off, and automatically open the application program corresponding to the clamping device, thereby greatly improving the user experience.

In order to make the above-mentioned features and advantages of the disclosure comprehensible, embodiments accompanied with drawings are described in detail below.

DETAILED DESCRIPTION OF DISCLOSED EMBODIMENTS

Figure 1:
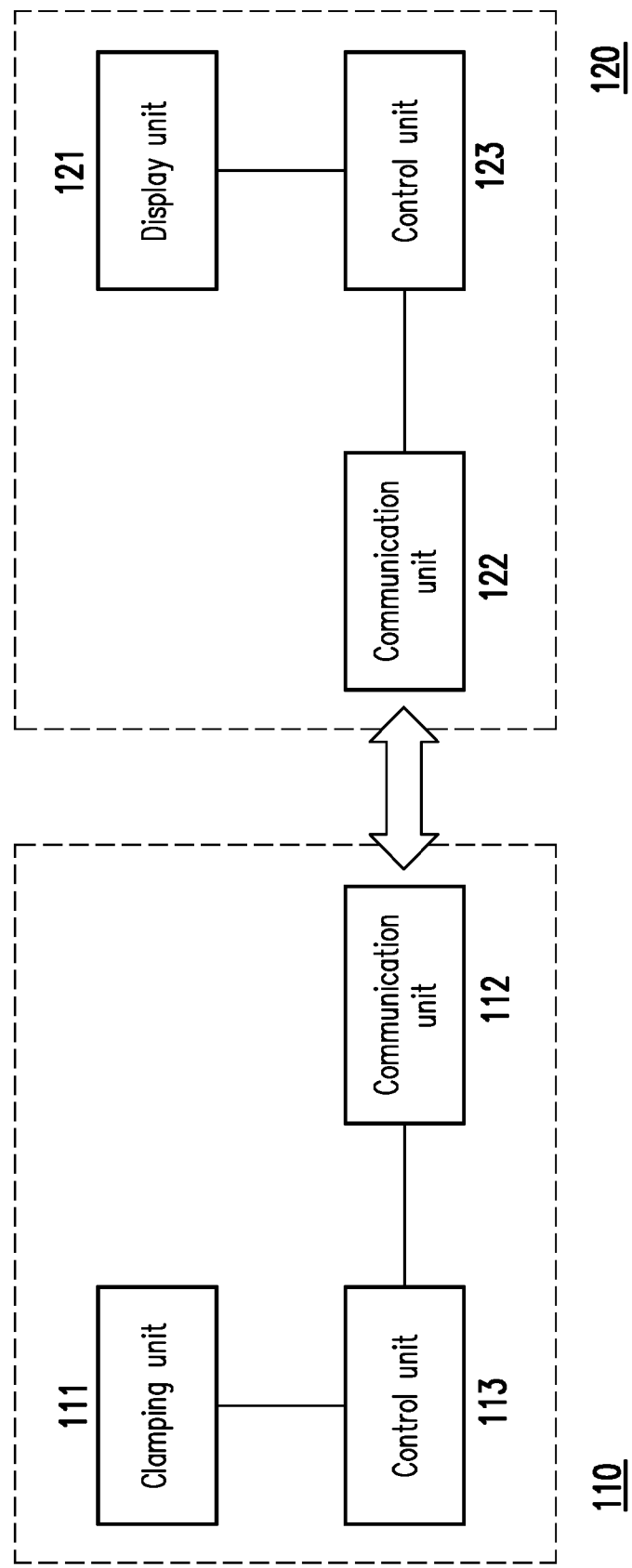
FIG. 1 is a schematic diagram of a circuit block of a clamping device and an electronic device according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to related descriptions of each other.

FIG. 1 is a schematic diagram of a circuit block of a clamping device 110 and an electronic device 120 according to an embodiment of the disclosure. In the embodiment shown on the left side of FIG. 1, the clamping device 110 includes a clamping unit 111, a communication unit 112, and a control unit 113. The clamping unit 111 is suitable for clamping the electronic device 120, and the control unit 113 is coupled to the clamping unit 111 and the communication unit 112. In the embodiment shown on the right side of FIG. 1, the electronic device 120 includes a display unit 121, a communication unit 122 and a control unit 123. The control unit 123 is coupled to the display unit 121 and the communication unit 122. According to practical applications, the electronic device 120 may be, for example, portable mobile devices with a display function, such as a cell phone, a personal digital assistant (PDA), a smart phone, an e-book, or a gaming console, which is not limited in this embodiment.

In this embodiment, the communication unit 112 of the clamping device 110 is suitable for pairing with the communication unit 122 of the electronic device 120. The communication unit 122 of the electronic device 120 is suitable for pairing with the communication unit 112 of the clamping device 110. For example, in some embodiments, the control unit 113 of the clamping device 110 may send a pairing request via the communication unit 112. When the communication unit 122 of the electronic device 120 receives the pairing request sent via the communication unit 112, the control unit 123 may control the communication unit 122 to pair with the communication unit 112. According to design requirements, the communication unit 112 and/or the communication unit 122 may include, for example, devices that support communication protocol such as wireless fidelity (Wi-Fi), worldwide interoperability for microwave access (WiMAX), Bluetooth, ultra-wideband (UWB) or radio-frequency identification (RFID), which may send out wireless transmission signals to establish a wireless connection with another (or multiple) communication unit.

In some embodiments, the display unit 110 may have a turned-off state, a turned-on state, an unlocked state, or other states. According to design requirements, the display unit 121 may be, for example, a liquid crystal display (LCD), an electronic paper display (EPD), a polymer-dispersed liquid crystal, a cholesteric liquid crystal, a light emitting diode (LED) display, a field emission display (FED), an organic light emitting diode (OLED), an active-matrix organic light-emitting diode (AMOLED) display, a flexible display, a transparent light emitting diode display, or other display devices that provide display functions.

According to design requirements, the related functions of the control unit 113 and/or the control unit 123 may be implemented as hardware using hardware description languages (such as Verilog HDL or VHDL), or other suitable programming languages. For example, the related functions of the control unit 113 and/or the control unit 123 may be implemented in one or more microcontrollers, microprocessors, application-specific integrated circuits (ASIC), digital signal processor (DSP), field programmable gate array (FPGA), and/or various logic blocks, modules, and circuits in other processing units. In terms of software and/or firmware, the related functions of the control unit 113 and/or the control unit 123 may be implemented as programming codes. For example, it is implemented using general programming languages (e.g., C, C++, or assembly language) or other suitable programming languages. The programming code may be recorded/stored in a "non-transitory computer readable medium", such as a read only memory (ROM), a tape, a disk, a card, a semiconductor memory, a programmable logic circuit and/or a storage device. A central processing unit (CPU), a microcontroller or a microprocessor may read and execute the programming code from the non-transitory computer-readable medium, thereby achieving related functions.

According to practical applications, the clamping device 110 and/or the electronic device 120 may also include other elements not shown in FIG. 1, such as a control switch, a sensing circuit, a storage device, an application programming interface (API), a power circuit, or other elements/circuits. For example, in some embodiments, a user may download an application program (APP) corresponding to the clamping device 110 on the electronic device 120 through an app store or other methods, and the electronic device 120 may store the application program through a storage device. In some embodiments, the control unit 123 of the electronic device 120 may activate or close the application program through an application program interface. In some embodiments, before the communication unit 122 of the electronic device 120 is paired with the communication unit 112 of the clamping device 110, the application program may guide the user to initially pair the communication unit 122 of the electronic device 120 with the communication unit 112 of the clamping device 110, and set the clamping device 110 as a trusted device.

In some embodiments, the electronic device 120 may receive the control command sent by the communication unit 112 via the communication unit 122, and may turn on, unlock, or turn off the display unit 121 and/or open or close the application program via the control unit 123 according to the control command. In some embodiments, the control command may include a screen-off command and an application open command. When the electronic device 120 receives the screen-off command, the control unit 123 may turn off the display unit 121. When the electronic device 120 receives the application open command, the control unit 123 may turn on or unlock the display unit 121, and open the application program simultaneously. In some embodiments, the display unit 121 may display notification messages generated by the application program. In some embodiments, the user may choose whether to open the quick launch function of the application program, so as to determine whether to open the application program simultaneously when the display unit 121 is turned on or unlocked, and/or determine whether to clear the notification messages generated by the application program simultaneously when the display unit 121 is turned off. In some embodiments, the control unit 123 may also receive the control command of the user via the display unit 121 with touch function or a control switch (not shown) of the electronic device 120 itself, which is not limited in this embodiment. The implementation details of the electronic device 120 above is described in detail in subsequent embodiments.

Figure 2:
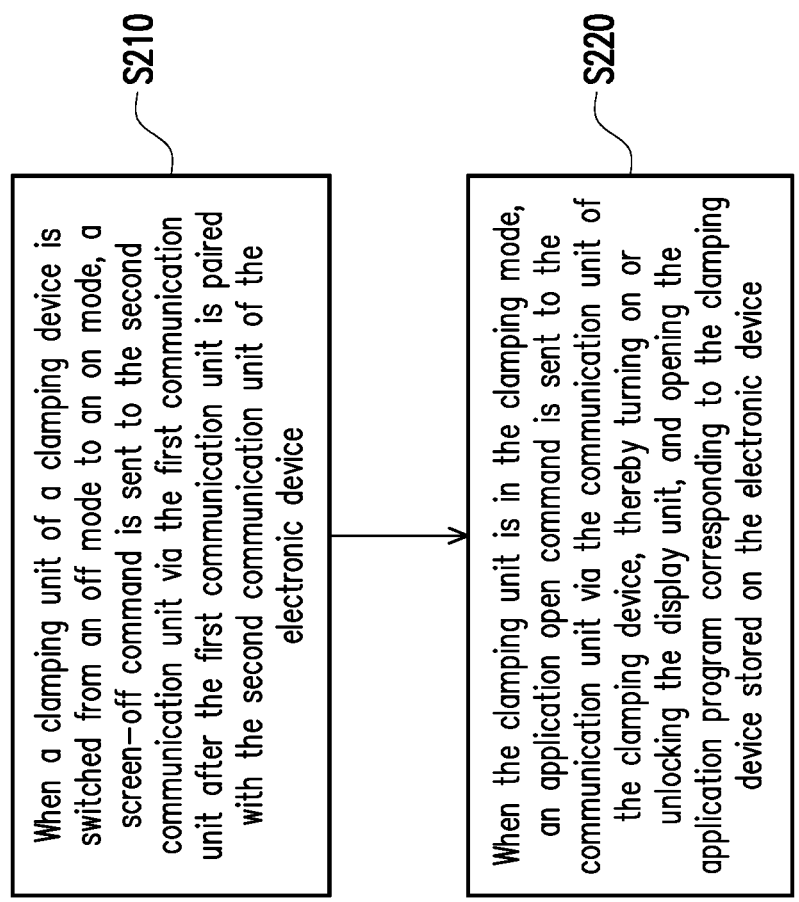
FIG. 2 is a schematic flowchart of a remote control method of an electronic device according to an embodiment of the disclosure.

According to practical applications, the clamping unit 111 may have various operation modes, such as an off mode, an on mode, a clamping mode, or other operation modes. The clamping unit 111 may be manually controlled by the user (e.g., rotating/moving/stretching/collapsing, a control switch, or other manual methods) or through automatic control to switch between different operation modes, so as to interact with the electronic device 120. For example, FIG. 2 is a schematic flowchart of a remote control method of an electronic device according to an embodiment of the disclosure. For the clamping device 110 and the electronic device 120 shown in FIG. 1, reference may be made to the related description of FIG. 2. Referring to FIG. 1 and FIG. 2 simultaneously, in step S210, when the clamping unit 111 of the clamping device 110 is switched from the off mode to the on mode, the control unit 113 of the clamping device 110 may control the communication unit 112 of the clamping device 110 to pair with the communication unit 122 of the electronic device 120. After the communication unit 112 of the clamping device 110 and the communication unit 122 of the electronic device 120 are paired and connected, the control unit 113 may send a screen-off command to the communication unit 122 via the communication unit 112 to turn off the display unit 121 of the electronic device 120. In step S220, when the clamping unit 111 is in (or switched from other modes to) the clamping mode, the control unit 113 may send an application open command to the communication unit 122 via the communication unit 112 of the clamping device 110, thereby turning on/unlocking the display unit 121, and opening the application program corresponding to the clamping device 110 stored in the electronic device 120.

Figure 3B:
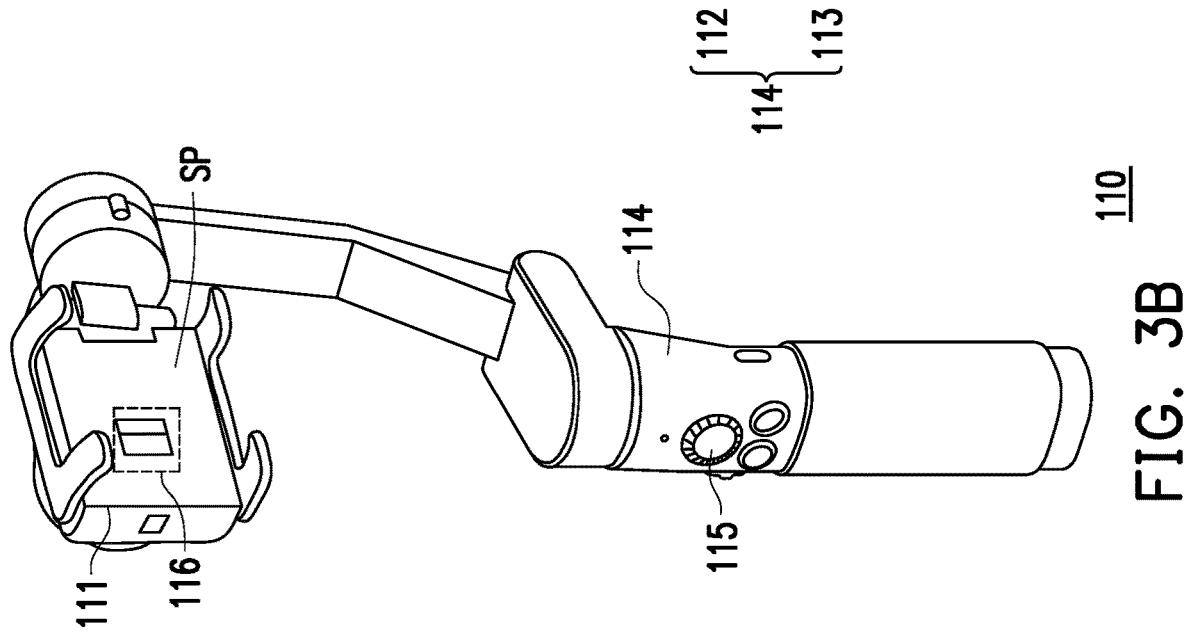
FIG. 3A, FIG. 3B, and FIG. 3C are schematic diagrams of operation scenarios of a clamping device according to an embodiment of the disclosure.
Figure 3A:
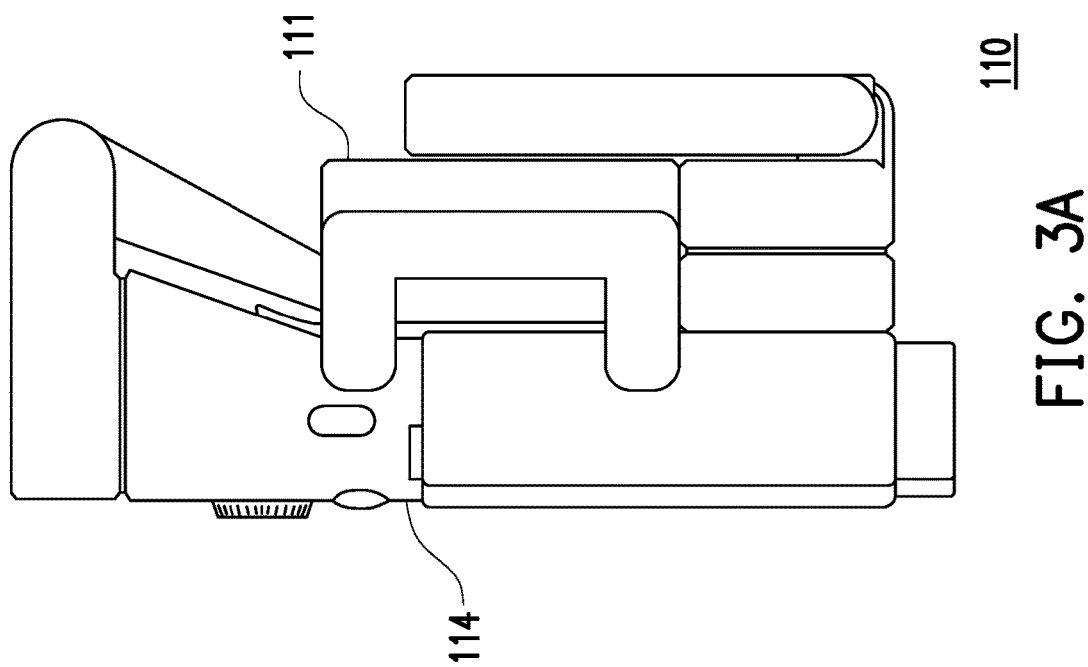
Figure 3C:
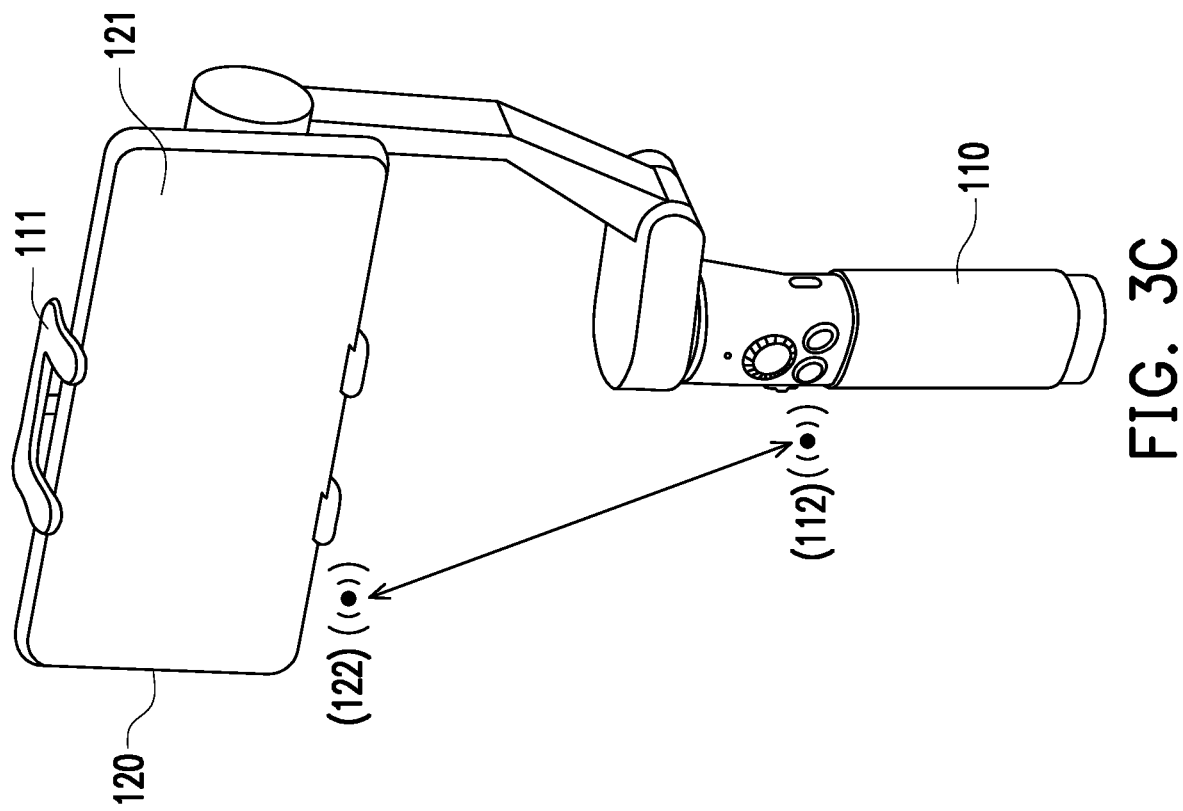

According to practical applications, in some embodiments, the clamping device 110 may also have various operation modes, such as a folded mode (e.g., two folds, three folds, or more), an expanded mode, or other operation modes. The clamping device 110 may also be manually controlled by the user (e.g., rotating/moving/stretching/collapsing, a control switch, or other manual methods) or through automatic control to switch and operate in different operation modes. For example, FIG. 3A, FIG. 3B, and FIG. 3C are schematic diagrams of operation scenarios of a clamping device 110 according to an embodiment of the disclosure. FIG. 3A illustrates a side schematic diagram of the clamping device 110 in the folded mode, FIG. 3B illustrates a schematic diagram of the clamping device 110 in the expanded mode, and FIG. 3C illustrates a schematic diagram of the clamping device 110 clamping the electronic device 120. In the embodiment shown in FIG. 3A, FIG. 3B, and FIG. 3C, the clamping device 110 includes a clamping unit 111 and a handle 114. In some embodiments, the interior of the handle 114 may include the communication unit 112 and the control unit 113. In some embodiments, the outer side of the handle 114 may include a power switch 115, which is not limited in this embodiment. In the embodiment shown in FIG. 3C, the clamping unit 111 is suitable for clamping the electronic device 120 having the display unit 121 and the communication unit 122, and the communication unit 112 of the clamping device 110 may pair with the communication unit 122 of the electronic device 120. The clamping unit 111, the communication unit 112, the control unit 113, the display unit 121, and the communication unit 122 shown in FIG. 3A, FIG. 3B, and FIG. 3C may be referred by analogy to the related descriptions of the clamping unit 111, the communication unit 112, the control unit 113, the display unit 121, and the communication unit 122 shown in FIG. 1. The device structures of FIG. 3A and FIG. 3B and the clamping method of FIG. 3C are only exemplary examples for convenience of description, and are not intended to limit the scope of implementation of the disclosure.

According to practical applications, the clamping device 110 may include one or more sensing units, a control switch, a power circuit, or other circuits/elements not shown in the figures. For example, in some embodiments, the clamping device 110 may include one or more folding sensing units coupled to the control unit 113 for sensing the folding state of the clamping device 110. In some embodiments, when the clamping device 110 is in a folded mode (as shown in FIG. 3A), the clamping unit 111 may be in the off mode that facilitates folding (e.g., not yet expanded). In some embodiments, when the folded sensing unit senses that the clamping device 110 is switched from the folded mode to the expanded mode (as shown in FIG. 3B), the control unit 113 may control the clamping unit 111 to switch from the off mode to the on mode to facilitate clamping the electronic device 120. For example, the clamping structure of the clamping unit 111 may be expanded to include the accommodating space SP in the on mode, the user may place the electronic device 120 in the accommodating space SP, and then manually or automatically control the clamping unit 111 to switch from the on mode to the clamping mode, so as to clamp the electronic device 120 located in the accommodating space SP.

For another example, in some embodiments, when the clamping device 110 is in the folded mode or switched from the expanded mode (or other modes) to the folded mode, the power circuit of the clamping device 110 may be cut off to stop power supply to all (or some) of the circuits/components of the clamping device 110. In some embodiments, when the clamping device 110 is in the expanded mode or switched from the folded mode (or other modes) to the expanded mode, the power circuit of the clamping device 110 may be conducted to provide electrical power to normally supply power to the circuits/components of the clamping device 110. In some embodiments, the power switch 115 on the outer side of the handle 114 may be coupled to the power circuit inside the clamping device 110, and the user may switch the power supply of the clamping device 110 on and off through the power switch 115. In some embodiments, the switching of the power switch 115 may also correspond to controlling the clamping unit 111 to enter an on mode or an off mode (or other modes), which is not limited in this embodiment.

For another example, in some embodiments, the clamping device 110 may include one or more sensing units for sensing whether the accommodating space SP of the clamping unit 111 includes the electronic device 120 (or other devices). For example, in the embodiment shown in FIG. 3B, the clamping unit 111 may include a sensing unit 116 coupled to the control unit 113. The sensing unit 116 may be, for example, an infrared sensor (IR sensor), an optical sensor, an ultrasonic sensor, a micro switch, or other sensors, which is not limited in this embodiment. When the clamping unit 111 is in the on mode and the sensing unit 116 senses that the electronic device 120 is located in the accommodating space SP of the clamping unit 111, the control unit 113 may control the clamping unit 111 to switch from the on mode to the clamping mode, to clamp the electronic device 120 located in the accommodating space SP, as shown in FIG. 3C. In some embodiments, when the clamping unit 111 is in the on mode, but the sensing unit 116 does not sense that the electronic device 120 is located in the accommodating space SP for more than a predetermined time, the power circuit of the clamping device 110 may be cut off to reduce the power consumption of the clamping device 110.

In the embodiment shown in FIG. 3C, in some embodiments, when the communication unit 112 of the clamping device 110 has completed pairing with the communication unit 122 of the electronic device 120 (for details of the pairing, please refer to step 210 shown in the aforementioned FIG. 2), and when the clamping unit 111 is in the clamping mode, the control unit of the electronic device 120 (not shown, please refer to the related description of the control unit 123 shown in FIG. 1) may send the posture information of the electronic device 120 (e.g., motion state information such as the accelerometer and the gyroscope) to the communication unit 112 via the communication unit 122. In some embodiments, the control unit 113 of the clamping device 110 may receive the posture information of the electronic device 120 via the communication unit 112 to adjust the three-axis (or two-axis) setting of the clamping unit 111 according to the posture information. For example, the electronic device 120 may be kept in a stable state in the three-dimensional space through one or more motors to perform inverse motions related to the posture information.

Figure 4:
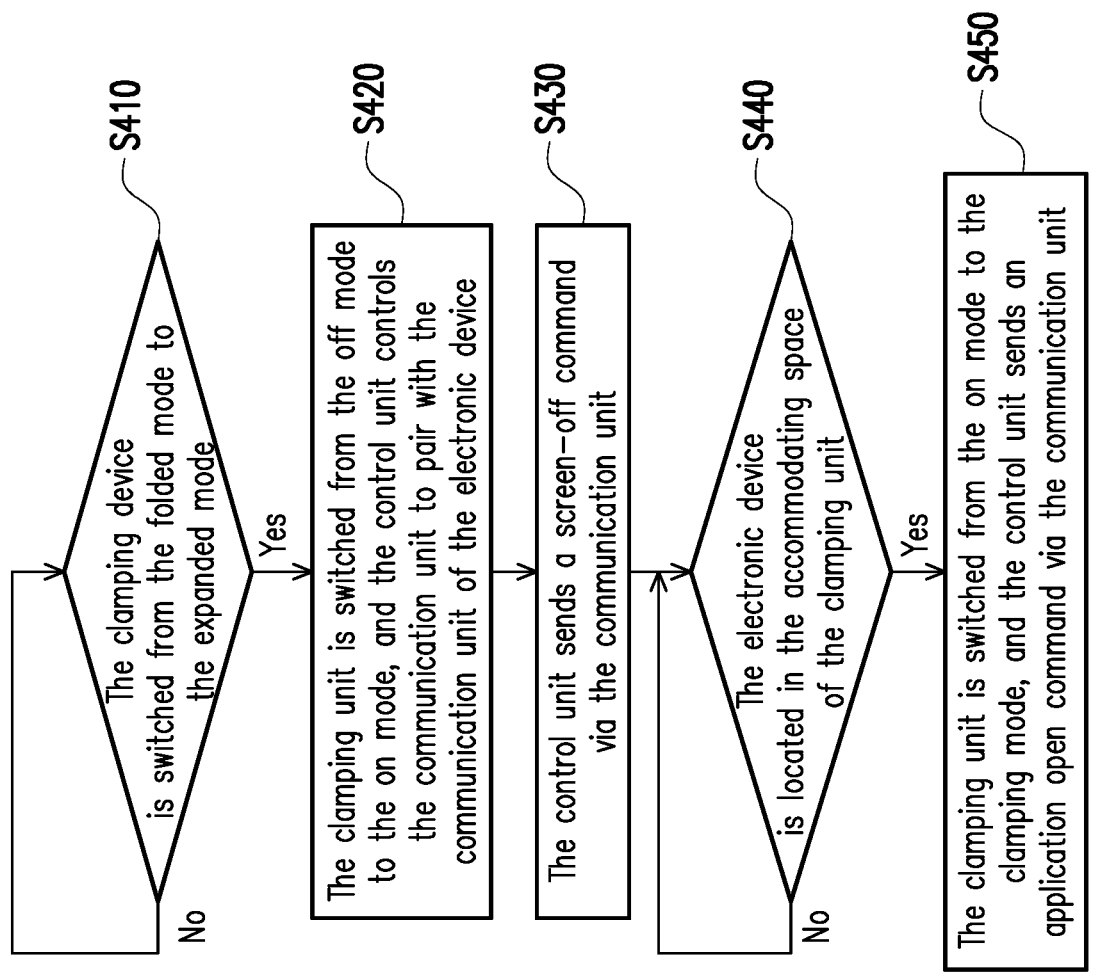
FIG. 4 is a schematic flowchart of a control method of a clamping device according to an embodiment of the disclosure.
Figure 5:
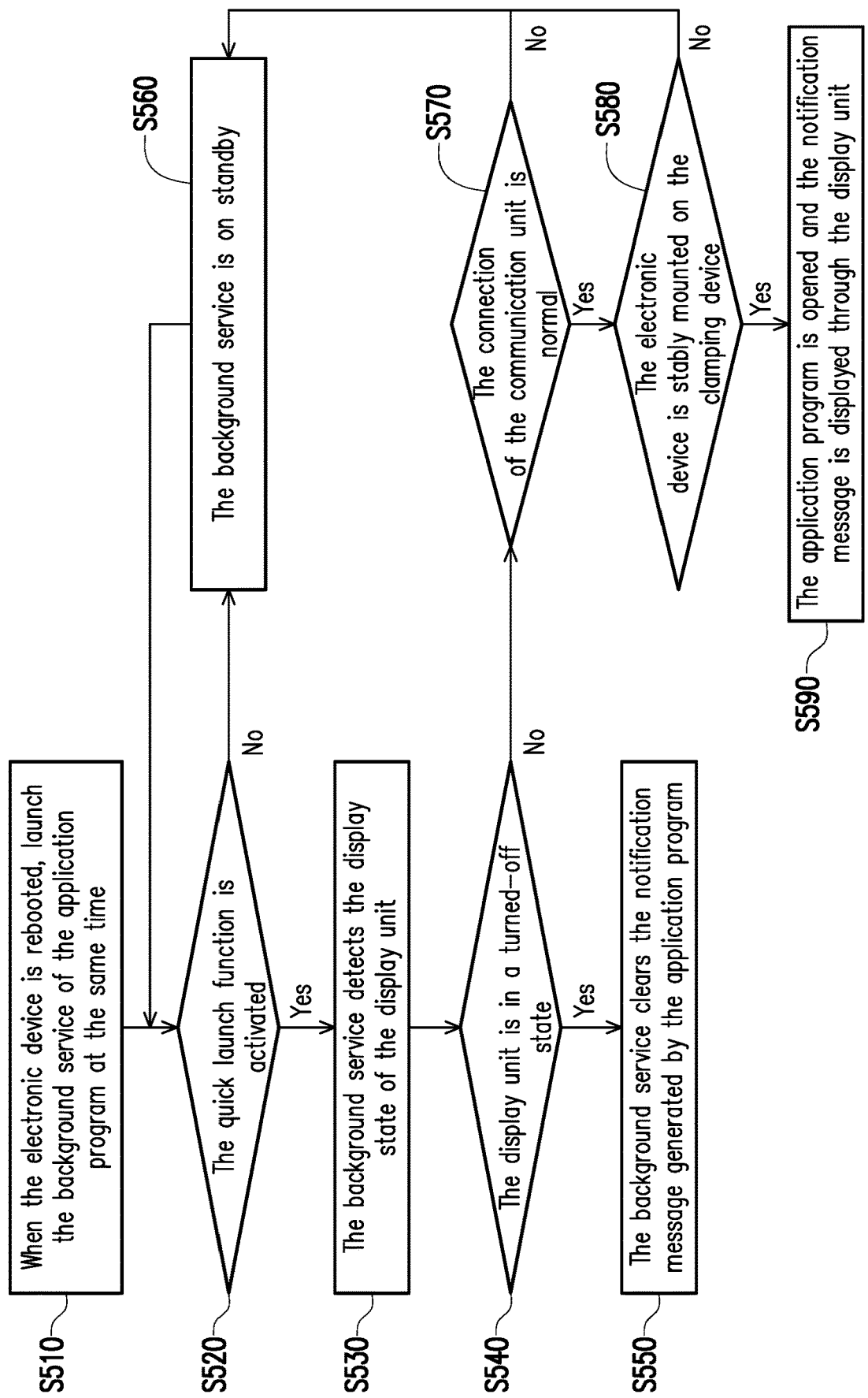
FIG. 5 is a schematic flowchart of a control method of an electronic device according to an embodiment of the disclosure.

For the actual implementation details of the clamping device 110 and the electronic device 120 of the aforementioned embodiments, reference may be made to FIG. 4 and FIG. 5. FIG. 4 is a schematic flowchart of a control method of a clamping device according to an embodiment of the disclosure. Referring to FIG. 3A, FIG. 3B, FIG. 3C, and FIG. 4 simultaneously, in step S410 shown in FIG. 4, when the clamping device 110 is switched from the folded mode to the expanded mode, the control unit 113 may control the clamping unit 111 to switch from the off mode to the on mode, and control the communication unit 112 to pair with the communication unit 122 of the electronic device 120 (step S420). In step S430, after the pairing is completed, the control unit 113 may send a screen-off command to the electronic device 120 via the communication unit 122. Next, in step S440, when it is determined (e.g., through the sensing unit 116 shown in FIG. 3B) that the electronic device 120 is located in the accommodating space SP of the clamping unit 111, the control unit 113 may control the clamping unit 111 to switch from the on mode to the clamping mode, and send an application open command to the electronic device 120 via the communication unit 112 (step S450).

FIG. 5 is a schematic flowchart of a control method of an electronic device according to an embodiment of the disclosure. Referring to FIG. 1 and FIG. 5 simultaneously, in step S510 shown in FIG. 5, when the electronic device 120 is rebooted, the control unit 123 of the electronic device 120 may launch the background service corresponding to the application program of the clamping device 110 simultaneously. In step S520, the user may select whether to activate the quick launch function of the application program on the application program interface. If the quick launch function is not opened, the background service may continue to be on standby (step S560). In step S530, after the quick launch function is opened, the background service may detect the display state of the display unit 121. In step S540, when the background service detects that the display unit 121 is in a turned-off state (e.g., based on a screen-off command or the user turns off the display unit 121), the background service may clear the notification message generated by the application program (step S550). In step S570, when the background service detects that the display unit 121 is in an turned-on state or an unlocked state (e.g., based on an application open command or by the user turning on/unlocking the display unit 121) or other states, the electronic device 120 may detect whether the connection between the communication unit 122 and the clamping device 110 is normal. In step S580, when the electronic device 120 determines that the electronic device 120 is stably mounted on the clamping device 110, the control unit 123 of the electronic device 120 may open the application program, and display the notification message of the application program through the display unit 121 (step S590). For example, as shown in step S440 to step S450 in FIG. 4, when the clamping unit 111 of the clamping device 110 is in the clamping mode and the clamping device 110 sends an application open command to the electronic device 120, it may be determined that the electronic device 120 is stably mounted on the clamping unit 111. In this embodiment, if the connection between the electronic device 120 and the clamping device 110 is abnormal/unstable or the electronic device 120 is not stably mounted on the clamping device 110, step S560 may be entered to keep the background service on standby without affecting the normal operation of the electronic device 120.

For example, when the clamping device 110 is manually switched from the folded mode to the expanded mode by the user (step S410 in FIG. 4), or when the clamping device 110 is in the expanded mode and the user manually turns on the clamping unit 111, so that the clamping unit 111 is switched from the off mode to the on mode, the clamping device 110 may send a pairing request to pair with the electronic device 120 (step S420 in FIG. 4). After the pairing is completed, the clamping device 110 may send a screen-off command to the electronic device 120 (step S430 in FIG. 4). At this time, the electronic device 120 automatically turns off the display unit 121, and the background service clears all notification messages generated by the application program corresponding to the clamping device 110 (step S540 to step S550 in FIG. 5). Next, if the user places the electronic device 120 in the accommodating space of the clamping unit 111, the clamping device 110 may control (or manually controlled by the user) the clamping unit 111 to switch from the on mode to the clamping mode, and send the application open command to the electronic device 120 (step S440 to step S450 in FIG. 4). At this time, the electronic device 120 may detect whether the connection between the electronic device 120 and the clamping device 110 is normal, and/or whether the electronic device 120 is stably mounted on the clamping device 110, then automatically turn on/unlock the display unit 121 and open the application program, and display the notification message of the application program through the display unit 121 (step S570 to step S590 in FIG. 5).

To sum up, in the clamping device, the electronic device, and the remote control method of the electronic device of the embodiments of the disclosure, when the clamping unit of the clamping device is switched from the off mode to the on mode, the control unit of the clamping device may control the clamping device to pair with the electronic device, and send a screen-off command to turn off the display unit of the electronic device. When the electronic device is placed in the accommodating space of the clamping unit and the clamping unit is in the clamping mode, the control unit of the clamping device may send an application open command to turn on/unlock the display unit of the electronic device, and automatically open an application program corresponding to the clamping device stored in the electronic device. In this way, the clamping device may automatically connect with the electronic device according to the state of the clamping unit, automatically turn the display unit of the electronic device on and off, and automatically open the application program corresponding to the clamping device, thereby greatly improving the user experience.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An electronic device, in which an application program corresponding to a clamping device is stored, the electronic device comprising:
    a display unit;
    a second communication unit, suitable for pairing with a first communication unit of the clamping device; and
    a control unit, coupled to the display unit and the second communication unit,
    wherein when the second communication unit receives a pairing request sent via the first communication unit, the control unit controls the second communication unit to pair with the first communication unit, and when the second communication unit receives a control command sent via the first communication unit, the control unit turns off the display unit or opens the application program according to the control command.

2. The electronic device according to claim 1, wherein when the control command is a screen-off command, the control unit turns off the display unit, when the control command is an application open command, the control unit turns on or unlocks the display unit and opens the application program.

3. The electronic device according to claim 1, wherein when the control command is an application open command, and a quick launch function of the application program is activated, the control unit turns on or unlocks the display unit and opens the application program.

4. The electronic device according to claim 1, wherein after the first communication unit and the second communication unit are paired and connected, the control unit sends posture information of the electronic device to the first communication unit via the second communication unit.

5. The electronic device according to claim 1, wherein when the electronic device is rebooted, the control unit launches a background service of the application program simultaneously.

6. The electronic device according to claim 5, wherein when the background service detects that the display unit is in a turned-off state, the background service clears a notification message generated by the application program.

7. The electronic device according to claim 5, wherein when the background service detects that the display unit is in a turned-off state and a quick launch function of the application program is activated, the background service clears a notification message generated by the application program.

8. A remote control method of an electronic device, wherein the electronic device comprises a display unit, a second communication unit, and a control unit, the remote control method comprising:
    controlling a first communication unit of a clamping device to pair with the second communication unit of the electronic device, and sending a screen-off command to the second communication unit via the first communication unit after a pairing is completed when a clamping unit of a clamping device is switched from an off mode to an on mode; and
    sending an application open command to the second communication unit via the first communication unit to turn on or unlock the display unit and open an application program corresponding to the clamping device stored in the electronic device when the clamping unit is in a clamping mode,
    wherein the step of controlling the first communication unit of the clamping device to pair with the second communication unit of the electronic device comprises:
    when the second communication unit receives a pairing request sent via the first communication unit, controlling the second communication unit to pair with the first communication unit by the control unit; and
    when the second communication unit receives a control command sent via the first communication unit, turning off the display unit or opening the application program according to the control command by the control unit.

9. The remote control method according to claim 8, further comprising:
    controlling the clamping unit to switch from the on mode to the clamping mode when the clamping unit is in the on mode and a sensing unit of the clamping device senses that the electronic device is located in an accommodating space of the clamping unit.

10. The remote control method according to claim 8, further comprising:
    wherein when the clamping unit is in the clamping mode, the electronic device sends posture information of the electronic device via the second communication unit to the first communication unit, the clamping device adjusts a three-axis setting of the clamping unit according to the posture information.

11. The remote control method according to claim 8, further comprising:
    opening the application program corresponding to the clamping device stored in the electronic device when the second communication unit receives the application open command.

12. The remote control method according to claim 8, further comprising:
    controlling the clamping unit to switch from the off mode to the on mode when the clamping device is switched from a folded mode to an expanded mode.

13. The remote control method according to claim 12, further comprising:
    conducting a power circuit of the clamping device when the clamping device is in the expanded mode.

14. The remote control method according to claim 8, further comprising:
    detecting a display state of the display unit via a background service of an application program of the electronic device,
    clearing a notification message generated by the application program when the background service detects that the display unit is in a turned-off state.

* * * * *